United States Patent Office 3,555,786
Patented Jan. 19, 1971

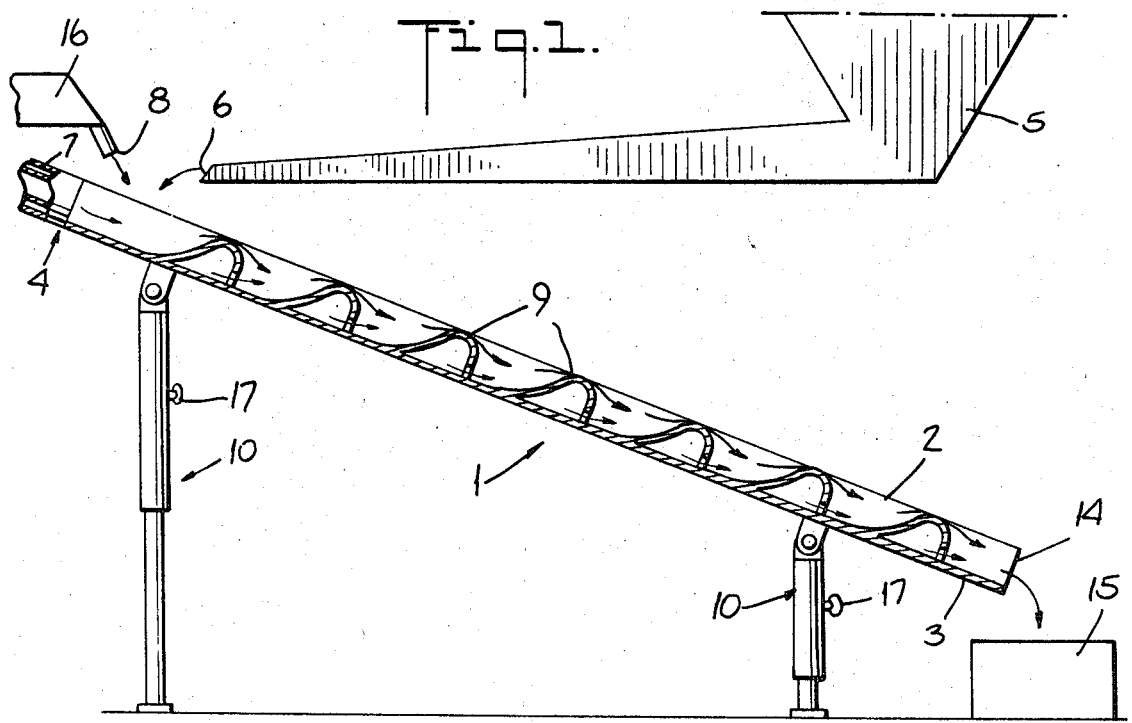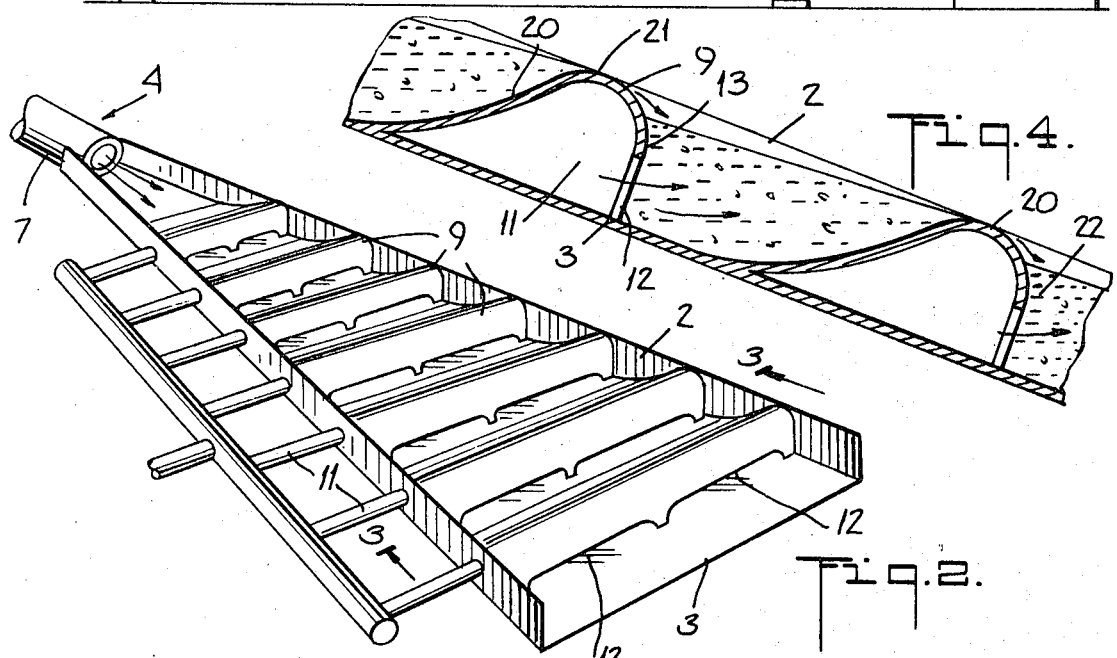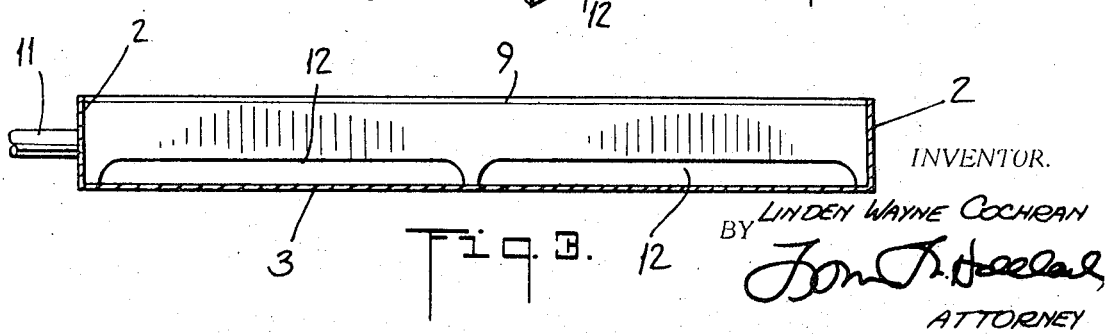

3,555,786
CORRUGATED REACTOR
Linden Wayne Cochran, Basking Ridge, N.J., assignor to Multi-Minerals Limited, Toronto, Ontario, Canada, a corporation of Canada
Filed Feb. 6, 1969, Ser. No. 797,173
Int. Cl. B01d 19/00
U.S. Cl. 55—196
6 Claims

ABSTRACT OF THE DISCLOSURE

The invention relates to an apparatus in which the contaminants resulting from the method of producing phosphoric acid are removed as volatile compounds by having the reactants flow over a corrugated surface. A gas sparging stream is introduced through outlets in the corrugations, and the corrugated surface is heated to aid in the removal of the volatilized contaminants.

---

The mechanism disclosed in this application is directed to a reactor design which promotes the removal of contaminants as volatile compounds from a reaction solution. For convenience, it will be described in connection with the removal of fluoride contaminants, as volatile fluorides, from a reaction solution comprising phosphate raw material, such as apatite, and an acidic digesting liquid. This reaction is used in the manufacture of phosphoric acid by either the so called "wet process," wherein the acidic solution comprises a strong mineral acid, or in the type of process disclosed by applicant in his copending application United States Ser. No. 386,764. Of course, it is apparent that the improved reactor design disclosed by this present application may be used for other chemical reactions.

The removal of fluoride contaminants from the reaction medium during the production of phosphoric acid is important in view of the high reactivity of the fluorine atom. Since hydrogen fluoride is a gas at temperatures in excess of room temperature and since the reaction or digestion of the phosphate raw material is carried out at elevated temperatures with relatively concentrated acidic solutions, volatilization of the contaminants as hydrogen fluoride is a convenient way in which to remove such highly reactive fluorine contaminants from the reaction medium.

The present invention provides means to agitate, heat and gas sparge the reaction solution to facilitate the removal of volatile compounds that contain the undesired contaminants.

Consequently, it is an object of this invention to provide an improved mechanism which promotes the removal of contaminants from solution as volatile compounds.

It is an object of this invention to provide an improved mechanism which agitates a reaction solution without use of stirrers or other agitation devices which promotes removal of volatile compounds therefrom.

It is a further object of this invention to provide a more thorough and intimate gas sparging of the reaction solution to remove volatile compounds therefrom.

These and other objects will become apparent from an examination of the specification and appended claims, and these and other objects not specifically mentioned herein will become apparent to one skilled in the art upon employment of the invention in practice.

A preferred embodiment has been chosen for purposes of illustration and is pictured in the drawings wherein:

FIG. 1 is a sectional view of a reactor and related equipment embodying the present invention;

FIG. 2 is a perspective view of the reactor;

FIG. 3 is a view of the reactor taken along line 3—3 of FIG. 2; and

FIG. 4 is an enlarged sectional view of the corrugations of the present reactor.

The improved reactor 1 is shown in FIG. 1 and comprises a metal chute having side walls 2 and a bottom surface 3. Inlet means 4 are provided for the reaction solution, which in the preferred embodiment, comprises an acidic digesting liquor. The inlet means 4 for the solution may be encased in a steam jacket 7 to insure that the solution remains at the proper reaction temperature. Raw material comprising phosphate containing rock, such as apatite, is fed into the apparatus from a feeder 5 through suitable inlet means 6. Other inlet means 8 connected to appropriate feeder apparatus 16 may be provided if desired, for introduction of additional chemical substances which may be desired.

A series of hollow corrugations 9 are provided on the bottom 3 of the apparatus 1 over which the reaction solution flows or cascades as indicated by the upper arrows in FIG. 1. The corrugations 9 are shown in greater detail in FIG. 4 and have an upwardly tapered rear surface 20, a curved crest 21 and a substantially straight front wall 22 which is substantially normal to the bottom wall 3. Outlet means 12 are formed in the front wall 22 in order to permit sparging gas to be emitted therefrom, as will be more fully described. It is to be understood, however, that the shape may be changed if desired, or a different type of cascade suface, such as steps may be used.

The liquid flows down the reactor 1 and moves over each corrugation 9, falling in a sharp drop over each front wall 22 to permit the liquid to be agitated thoroughly. The speed of flow may be varied as desired by simply altering the slope of the surface, such as by adjustment of the height of legs 10 of apparatus 1 by appropriate adjusting means, such as screws 17. Although, in the preferred embodiment, the reactor 1 is shown as being sloped, it is to be understood that it may lie flat, and the solution may be pumped over the corrugations to achieve the same result.

In order to provide an intimate and thorough gas sparging of the stream of fluid, gas line 11 is mounted to communicate with the interior of hollow corrugations 9 to permit gas to be supplied thereto. Outlet means 12 in the front walls 22 of the hollow corrugations 9 allows the gas stream to be discharged directly into the flow of liquid as it is being agitated by dropping over the crest 21. In the preferred embodiment of the invention the gas that is used is moisture laden preheated air, however, other gases which may aid in sweeping volatile compounds from the reactor may also be employed, if desired.

In order to further promote volatilization, the bottom surface 3 of the reactor 1 is preferably heated. This may be done by the inclusion of either conventional steam or electric heating means (not shown). Heating the air in the gas lines 11 also aids in heating the reactor 1 and promoting volatilization.

The solution leaves the apparatus at its lower end or outlet 14 and proceeds to other chemical apparatus 15 for appropirate work up, such as crystallization and contacting of the purified salt with a cationic resin to form phosphoric acid.

It will be seen that the above apparatus insures an improved air sparging and agitation action without the need for complex agitation devices and also provides means for maintaining the reaction medium at elevated temperature.

A great variety of bumpy, uneven, furrowed or roughened surface designs may be formulated to accomplish the object of this invention. The terms "corrugates" and "corrugations" as used in this specification and the appended claims is meant to cover the use of such bumpy, uneven, furrowed or roughened surfaces.

As various changes may be made in the form, construction and arrangement of the parts herein without departing from the spirit and scope of the invention and without sacrificing any of its advantages it is to be understood that all matter herein is to be interpreted as illustrative and not in a limiting sense.

I claim:

1. A reactor mechanism for removing contaminants from a reaction solution comprising an inclined chute, said chute having a bottom wall and hollow corrugations therein, means for causing a reaction solution to flow over said corrugations, means for introducing a sparging gas into said hollow corrugations, outlet means in said corrugations to permit said sparging gas to be emitted therefrom, said corrugations having an inclined rear wall and a front wall substantially perpendicular to the bottom wall of the chute, said outlet means being in said front wall of the corrgations and being below the level of reaction solution flowing over said corrugations.

2. A mechanism as claimed in claim 1, wherein sparging lines are mounted adjacent said chute for introducing sparging gas into the corrugations.

3. A mechanism as claimed in claim 1, wherein means are provided for heating said corrugated surface.

4. A mechanism as claimed in claim 1, wherein means are provided whereby the angle of the chute may be adjusted.

5. A mechanism as claimed in claim 1, wherein said chute comprises a pair of side walls.

6. A mechanism as claimed in claim 5 wherein said side walls diverge away from each other and wherein said bottom wall and said corrugations extend from side wall to side wall.

References Cited
UNITED STATES PATENTS

| 487,147 | 1/1893 | Golding | 261—114 |
|---|---|---|---|
| 737,326 | 8/1903 | Bonner et al. | 209—476 |
| 2,709,003 | 5/1955 | Lowe | 209—458 |
| 2,884,236 | 4/1959 | Maille | 261—114 |

SAMIH N. ZAHARNA, Primary Examiner

R. W. BURKS, Assistant Examiner

U.S. Cl. X.R.

55—42; 261—112, 124